US012642739B1

(12) United States Patent
Shao

(10) Patent No.: US 12,642,739 B1
(45) Date of Patent: Jun. 2, 2026

(54) COMPOUND MASSAGE ACTION MASSAGER, A MASSAGE ASSEMBLY AND A MASSAGE SYSTEM

(71) Applicant: Shenzhen Hijoy Technology Co., Ltd., Shenzhen (CN)

(72) Inventor: Zhubiao Shao, Shenzhen (CN)

(73) Assignee: Shenzhen Hijoy Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/215,237

(22) Filed: May 21, 2025

(30) Foreign Application Priority Data

Apr. 9, 2025 (CN) ......................... 202520660598.0

(51) Int. Cl.
*A61H 19/00* (2006.01)
*A61H 9/00* (2006.01)
(Continued)

(52) U.S. Cl.
CPC ......... *A61H 23/006* (2013.01); *A61H 9/0057* (2013.01); *A61H 19/32* (2013.01); *A61H 23/0263* (2013.01); *A61H 2201/0111* (2013.01); *A61H 2201/1215* (2013.01); *A61H 2201/1463* (2013.01); *A61H 2201/149* (2013.01); *A61H 2201/1664* (2013.01); *A61H 2201/1671* (2013.01); *A61H 2201/1695* (2013.01); *A61H 2201/5025* (2013.01); *A61H 2201/5043* (2013.01)

(58) Field of Classification Search
CPC .............. A61H 19/32; A61H 2201/149; A61H 2201/0111; A61H 23/006; A61H 9/0057
See application file for complete search history.

(56) References Cited

U.S. PATENT DOCUMENTS 4,059,100 A * 11/1977 Glage ................ A61H 23/0254 601/72
11,752,063 B1 * 9/2023 Huang ................... A61H 19/32 600/38

(Continued)

FOREIGN PATENT DOCUMENTS

DE 202024105518 U1 * 10/2024 ......... A61B 10/0058

OTHER PUBLICATIONS

Translation of DE202024105518 (Year: 2024).*

*Primary Examiner* — Timothy A Stanis

(57) ABSTRACT

The present disclosure relates to a compound massage action massager, a massage assembly and a massage system, wherein the massager comprises a first bracket, a second bracket, a guide bracket and at least two guide rods therebetween, and a power mechanism slidably mounted on the guide rods and comprising an eccentric member and a rotating member, wherein the eccentric member has an eccentric column, the guide bracket has a swing groove for the eccentric column, and the rotating member is connected to a flexible massage structure and a massage chamber thereon, and the first bracket is integrated with a suction mechanism connected to the massage chamber. When the power mechanism drives the eccentric member and the rotating member to rotate, the flexible massage structure performs reciprocating, rotating and sucking massages on the inserted part of human body synchronously, to form a compound massage action for better massage effect.

8 Claims, 6 Drawing Sheets

(51) Int. Cl.
*A61H 23/00* (2006.01)
*A61H 23/02* (2006.01)

(56) References Cited

U.S. PATENT DOCUMENTS

| | | | | |
|---|---|---|---|---|
| 2020/0178943 | A1* | 6/2020 | Nakamura | A61F 5/451 |
| 2023/0012669 | A1* | 1/2023 | Liu | A61H 19/32 |
| 2023/0083660 | A1* | 3/2023 | Raju | A61H 19/32 600/38 |
| 2023/0114593 | A1* | 4/2023 | Li | A61H 19/44 600/38 |
| 2023/0126338 | A1* | 4/2023 | Shao | A61H 15/0078 600/38 |
| 2023/0210718 | A1* | 7/2023 | Zhou | A61H 19/32 600/38 |
| 2024/0099930 | A1* | 3/2024 | Luo | A61H 7/00 |
| 2025/0107785 | A1* | 4/2025 | Chen | A61H 19/32 |

* cited by examiner

COMPOUND MASSAGE ACTION MASSAGER, A MASSAGE ASSEMBLY AND A MASSAGE SYSTEM

RELATED APPLICATIONS

The present application claims the benefit of priority of Chinese Patent Application No. 202520660598.0, filed Apr. 9, 2025, and entitled "A COMPOUND MASSAGE ACTION MASSAGER, A MASSAGE ASSEMBLY AND A MASSAGE SYSTEM," the entire content of which is incorporated herein by reference.

TECHNICAL FIELD

The present disclosure relates to the technical field of massager, and in particular, to a compound massage action massager, a massage assembly and a massage system.

BACKGROUND

Massagers are mainly used to massage local parts of human body to relieve physical fatigue for physical and mental relaxation. Existing massagers are usually designed with motors and transmission mechanisms to realize actions of the massage part such as rotation and reciprocation, thereby massaging a certain part of human body. For example, a spiral matching structure is used to make the specific massage part reciprocate and rotate simultaneously, that is to say, reciprocating is realized on the basis of rotating. In this structure, a single power shaft is used to simultaneously realize rotating and pushing the massage part to reciprocate, during which the power shaft is subjected to a combined force of rotating and sliding, and long-term use would cause severe wear of the power shaft, resulting in an increase in the fit clearance between the power shaft and the massage part, which will lead to swaying during reciprocating, as well as a decrease in its service life.

In addition, some of existing massagers lack a massage action that integrates negative pressure sucking synchronously, which reduces the massage effect on human body.

SUMMARY

(I) Technical Problem

The purpose of the present invention is to provide a compound massage action massager, a massage assembly and a massage system, which massager, on the one hand, is designed with a compound realization mechanism that optimizes the reciprocating action and rotating action to avoid the flexible massage structure from swaying due to worn rotating shaft, and on the other hand, is able to perform reciprocating massage and sucking massage during rotating massage synchronously to form a compound massage action for better massage effect.

(II) Technical Solution

In order to achieve the above purpose, the present disclosure provides the following technical solution:

A compound massage action massager, comprising a first bracket and a second bracket, wherein a guide bracket and at least two guide rods are arranged between the first bracket and the second bracket; a power mechanism is slidably mounted on the two guide rods, wherein the power mechanism comprises an eccentric member and a rotating member, the eccentric member is provided with an eccentric column, and the guide bracket is provided with a swing groove for inserting the eccentric column, and the rotating member is connected to a flexible massage structure and a massage chamber on the flexible massage structure through a rotating shaft; the first bracket is integrated with a suction mechanism connected to the massage chamber; when the power mechanism drives the eccentric member and the rotating member to rotate synchronously, the flexible massage structure synchronously performs reciprocating massage, rotational massage and sucking massage on the part of human body that is inserted into the massage chamber.

Preferably, the power mechanism comprises a motor bracket slidably mounted on the guide rods, and both the eccentric member and the rotating member are rotatably mounted on the motor bracket, wherein the rotation axis of the eccentric member is perpendicular to the rotation axis of the rotating member, the eccentric member is engaged with the rotating member, a reducer motor is mounted on the motor bracket, and the output shaft of the reducer motor is fixedly connected to the eccentric member.

Preferably, the eccentric member and the rotating member are bevel gears.

Preferably, the eccentric member is a crown gear and the rotating member is a spur gear; or the eccentric member is a spur gear and the rotating member is a crown gear.

Preferably, the flexible massage structure comprises an adapter frame slidably mounted on the second bracket, wherein a rotating shaft is rotatably mounted between the adapter frame and the first bracket, the rotating shaft is fixed on a rotating member, one end of the rotating shaft extending out of the adapter frame is fixedly connected to a cup barrel, a flexible massage part is embedded in the cup barrel, and the massage chamber is arranged on the flexible massage part.

Preferably, the flexible massage part is provided with a protrusion extending into the massage chamber.

Preferably, a plurality of vibration motors evenly distributed circumferentially are embedded in the flexible massage part, a rotating conductive structure is mounted on the adapter frame, and the wires of the vibration motors are connected to the rotating conductive structure.

Preferably, a control circuit board is integrated on the guide bracket, and a display module and a control button module are integrated on the control circuit board.

Preferably, the second bracket comprises a connecting case and an isolation case that is concave and arranged inside the connecting case, wherein a waterproof rubber plug is embedded on the isolation case, and the waterproof rubber plug is used for the conductive cable that passes through the control circuit board and the rotating conductive structure; and a waterproof pad is provided between the isolation case and the rotating shaft.

Preferably, a first step structure and a second step structure are provided on the side wall of the connecting case, a first housing is mounted on the first bracket, and the open end of the first housing is inserted into the first step structure; a second housing extending into the first housing is inserted on the second step structure; the open end of the second housing extends to the opening of the massage chamber; and the second housing is provided with a protective cover on the open end.

Preferably, a buffer flexible ring is embedded in the open end of the second housing.

Preferably, each of the first step structure and the second step structure is provided with a sealing groove, and a sealing ring is provided in front of the sealing groove.

Preferably, a clamping ring groove is provided on the outer peripheral surface of the second housing, and a clamping convex ring to engage with the clamping ring groove is provided on the inner wall of the protective cover.

(III) Beneficial Effects

The entire power mechanism is slidably mounted on the guide rods, and when the power mechanism moves, it synchronously drives the eccentric member and the rotating member to rotate, wherein the eccentric member is provided with an eccentric column and extends into the swing groove. When the eccentric member rotates, the eccentric column swings in a reciprocating manner relative to the swing groove, thereby driving the entire power mechanism to slide on the guide rods in a reciprocating manner, and driving the rotating shaft and the flexible massage structure to simultaneously slide relative to the guide rods in a reciprocating manner. When the rotating member rotates, it drives the rotating shaft and the flexible massage structure to rotate synchronously relative to the power mechanism. In this way, the reciprocating motion of the flexible massage structure is achieved by the power mechanism sliding on the guide rods as a whole, and the rotating shaft only transmits the rotating force to drive the flexible massage structure to perform rotating massage.

On the one hand, the power mechanism slides relative to the guide rods while the rotating shaft transmits the rotational power and drives the flexible massage structure to move, therefore, the rotating shaft will not be worn, effectively avoiding the swaying of the flexible massage structure, which can improve the service life and stability; on the other hand, the rotation action is realized on the basis of the reciprocating action, forming an action separation structurally, so that there is no direct coordination between the two acting structures, which effectively avoids the risk of mutual wear.

In addition, the integrated sucking mechanism realizes the sucking action of the flexible massage structure. In this way, the power mechanism drives the eccentric member and the rotating member to rotate, to preform reciprocating massage, rotating massage and sucking massage on the part of human body inserted into the massage chamber simultaneously, forming a compound massage action for better massage effect.

BRIEF DESCRIPTION OF THE DRAWINGS

In FIG. 1 to FIG. 11, the relationship between the component names or lines and the numbers is as follows:

Figure 1:
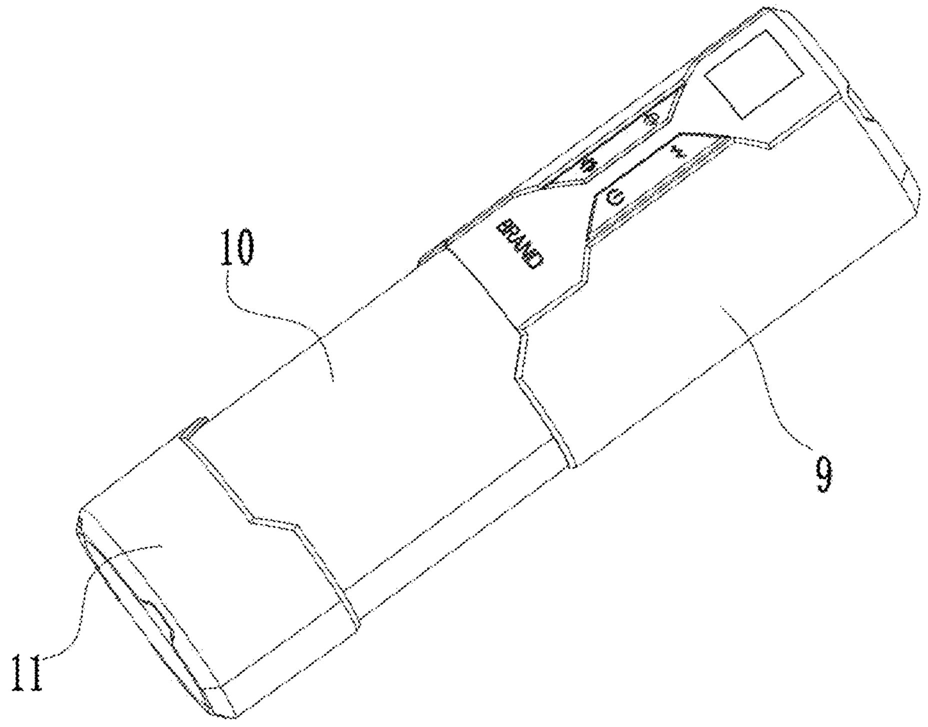
FIG. 1 is a schematic diagram of the structure of a massager as the embodiment of the present disclosure.

First bracket 1, second bracket 2, connecting case 21, isolation case 22, waterproof rubber plug 23, waterproof pad 24, first step structure 25, second step structure 26, sealing groove 27, sealing ring 28, guide rod 3, power mechanism 4, eccentric member 41, rotating member 42, eccentric column 43, motor bracket 44, reducer motor 45, guide bracket 5, swing groove 50, flexible massage structure 6, massage chamber 60, adapter frame 61, rotating shaft 62, cup barrel 63, flexible massage part 64, protrusion 65, vibration motor 66, rotating conductive structure 67, suction mechanism 7, control circuit board 8, first housing 9, second housing 10, protective cover 11, buffer flexible ring 12, clamping ring groove 13, clamping ring convex ring 14.

DETAILED DESCRIPTION

The technical solutions in the embodiment of the present disclosure will be clearly and completely described below with reference to the drawings in the embodiment of the present disclosure. Obviously, the embodiment described is only a part of, not all, the embodiments of the present disclosure.

As shown in FIG. 2, FIG. 3, FIG. 4, and FIG. 11, a compound massage action massager is provided as the embodiment of the present disclosure, comprising a first bracket 1 and a second bracket 2, wherein a guide bracket 5 and at least two guide rods 3 are arranged between the first bracket 1 and the second bracket 2; the first bracket 1 and the second bracket 2 can be fixedly connected to other parts respectively to form a fixation, or the first bracket 1 and the second bracket 2 can be directly fixedly connected; the at least two guide rods 3 also serve as the connection structure between the first bracket 1 and the second bracket 2, and specifically, in this embodiment, four guide rods 3 are used; and a power mechanism 4 is slidably mounted on the guide rods 3, so that the power mechanism 4 can only slide along the guide rods 3.

Specifically, the power mechanism 4 comprises an eccentric member 41 and a rotating member 42, wherein both the eccentric member 41 and the rotating member 42 move in a rotational manner. Among them, the eccentric member 41 is provided with an eccentric column 43, and the guide bracket 5 is provided with a swing groove 50 for inserting the eccentric column 43. When the eccentric member 41 is driven to rotate, the eccentric column 43 is engaged with the swing groove 50 in a sliding manner, and the entire power mechanism 4 is driven to reciprocate on the guide rods 3 by the swing force.

In addition, the rotating member 42 is connected to a flexible massage structure 6 and a massage chamber 60 on the flexible massage structure 6 through a rotating shaft 62.

When they are driven by the rotating member 42 to rotate, they further drive the rotating shaft 62, the flexible massage structure 6 and the rotating member 42 to rotate synchronously. In this way, when the entire power mechanism 4 reciprocates relative to the guide rods 3, the rotating shaft 62 and the flexible massage structure 6 are simultaneously driven to reciprocate relative to the guide rods 3 simultaneously. In this way, when the flexible massage structure 6 rotates independently, it can also be driven to reciprocate along with the power mechanism 4 as a whole, thereby forming a compound action of reciprocating movement and rotation on the flexible massage structure 6. In this structure, the rotating shaft 62 transmits the rotation of the rotating member 42, and it serves as a connecting member simultaneously to drive the flexible massage structure 6 and the power mechanism 4 to reciprocate relative to the guide rods 3. In this way, the wear of the rotating shaft 62 during action is extremely small, which can improve the service life; in addition, as the flexible massage structure 6, the rotating shaft 62 and the power mechanism 4 are connected as a whole and reciprocate relative to the four guide rods 3, which will not cause the risk of swaying of the flexible massage structure 6 during action, thereby improving stability.

In addition, the first bracket 1 is integrated with a suction mechanism 7 connected to the massage chamber 60.

When a power mechanism 4 is used to output the power, so as to realize the relative movement of the entire power mechanism 4, the flexible massage structure 6 is driven to rotate, and the suction mechanism 7 with negative pressure adsorption function is integrated to further perform the sucking action. Specifically, the suction mechanism 7 is an integrated structure that can be designed with the existing technology, and it mainly comprises an air pump and a pipeline connected to the air pump, wherein the air pump is operated to realize inflation or inhalation of the massage chamber 60. In this way, when the power mechanism 4 drives the eccentric member 41 and the rotating member 42 to rotate synchronously, the flexible massage structure 6 performs reciprocating massage, rotating massage and sucking massage synchronously on the part of human body inserted into the massage chamber 60. When a part of human body part is inserted into the massage chamber 60, a compound massage action consisting of rotating massage, reciprocating massage and sucking massage can be realized, for higher massage comfort.

With the acting structures mentioned above, when a part of human body is inserted into the massage chamber and remains stationary, the flexible massage structure 6 is driven to perform reciprocating massage and rotating massage on the inserted part of human body, and the sucking mechanism 7 is used simultaneously to perform sucking massage on the inserted part of human body.

Figure 5:
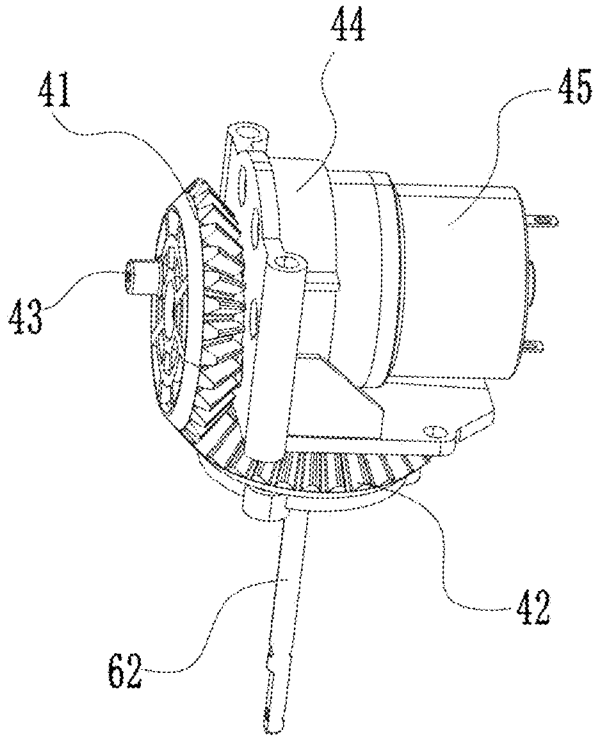
FIG. 5 is a schematic diagram of the structure of a power mechanism in the embodiment of the present disclosure.

Among them, the power mechanism 4 realizes power output and position movement, as shown in FIG. 5, and the power mechanism 4 comprises a motor bracket 44 slidably mounted on the guide rods 3, and both the eccentric member 41 and the rotating member 42 are rotatably mounted on the motor bracket 44, wherein the rotation axis of the eccentric member 41 is perpendicular to the rotation axis of the rotating member 42, and the eccentric member 41 is engaged with the rotating member 42. As the eccentric member 41 and the rotating member 42 are rotatably mounted by the motor bracket 44, the eccentric member 41 and the rotating member 42 are engaged to achieve synchronous rotation, and the rotation axes are perpendicular to each other, so that the eccentric member 41 forms a force to drive the motor bracket 44 to slide relative to the guide rods 3 when rotating, and the rotating member 42 rotates synchronously with the flexible massage structure 6. In addition, a reducer motor 45 is mounted on the motor bracket 44, and the output shaft of the reducer motor 45 is fixedly connected to the eccentric member 41. When the reducer motor 45 outputs the power, it only needs to be driving connected to either the eccentric member 41 or the rotating member 42. In order to optimize the internal space and reduce the size, in this embodiment, the output shaft of the reducer motor 45 is connected to the eccentric member 41, and the rotational power is transmitted to the rotating member 42 through the eccentric member 41.

Figure 6:
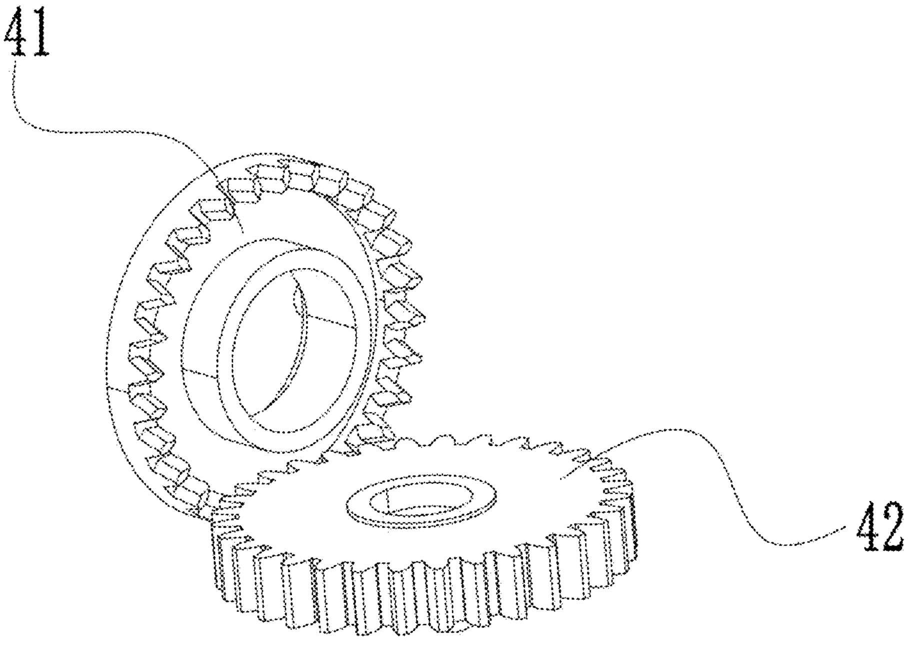
FIG. 6 is a schematic diagram of the structure of the second embodiment method of engagement between the eccentric member and the rotating member in the embodiment of the present disclosure.
Figure 7:
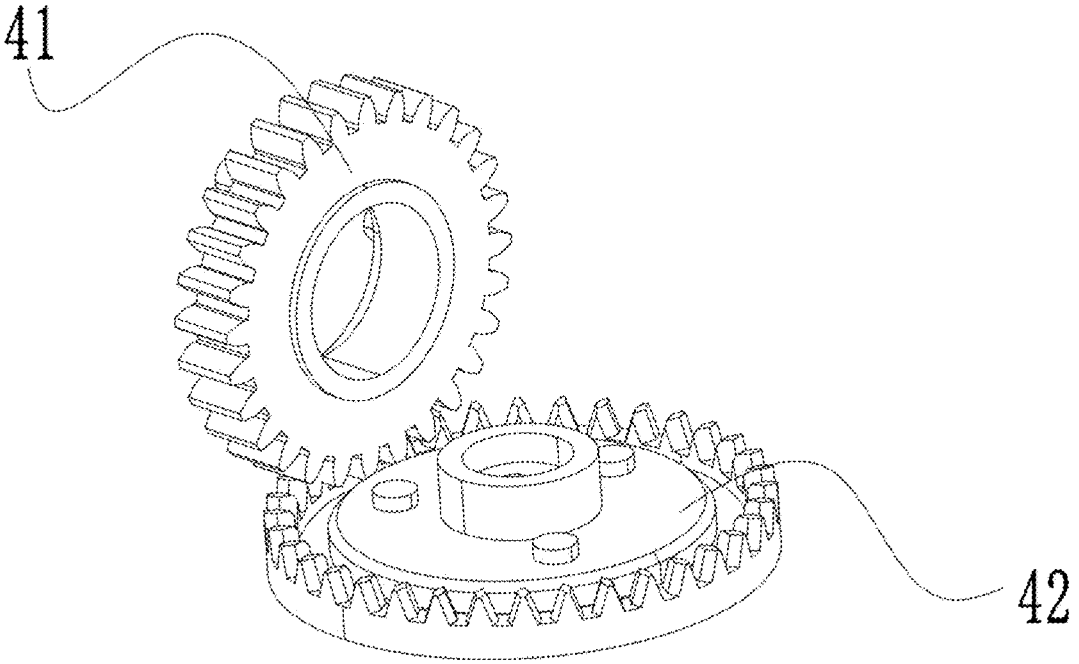
FIG. 7 is a schematic diagram of the structure of the third embodiment method of engagement between the eccentric member and the rotating member in the embodiment of the present disclosure.

For the purpose of power transmission between the eccentric member 41 and the rotating member 42, and direct engagement transmission to avoid intermediate transmission structure, in one embodiment method as shown in FIG. 5, both the eccentric member 41 and the rotating member 42 are bevel gears; in a second embodiment method as shown in FIG. 6, the eccentric member 41 is a crown gear and the rotating member 42 is a spur gear; and in a third embodiment method as shown in FIG. 7, the eccentric member 41 is a spur gear and the rotating member 42 is a crown gear. The above three embodiment methods can realize engagement transmission when the rotation axes are perpendicular to each other in a small space.

Figure 2:
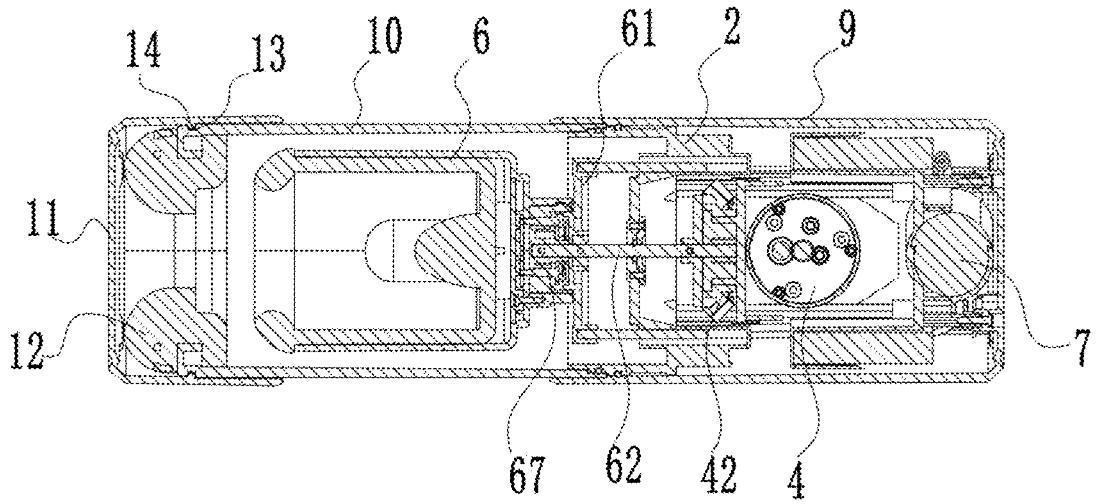
FIG. 2 is a schematic diagram of the cross-sectional structure of a massager as the embodiment of the present disclosure.
Figure 3:
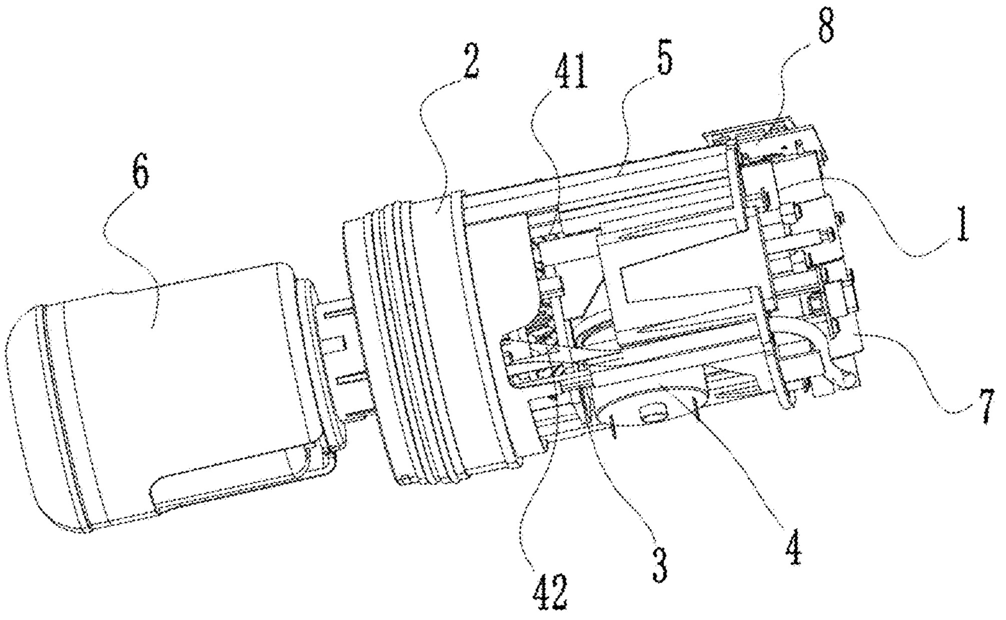
FIG. 3 is a schematic diagram of the structure of the compound action core in the embodiment of the present disclosure.
Figure 4:
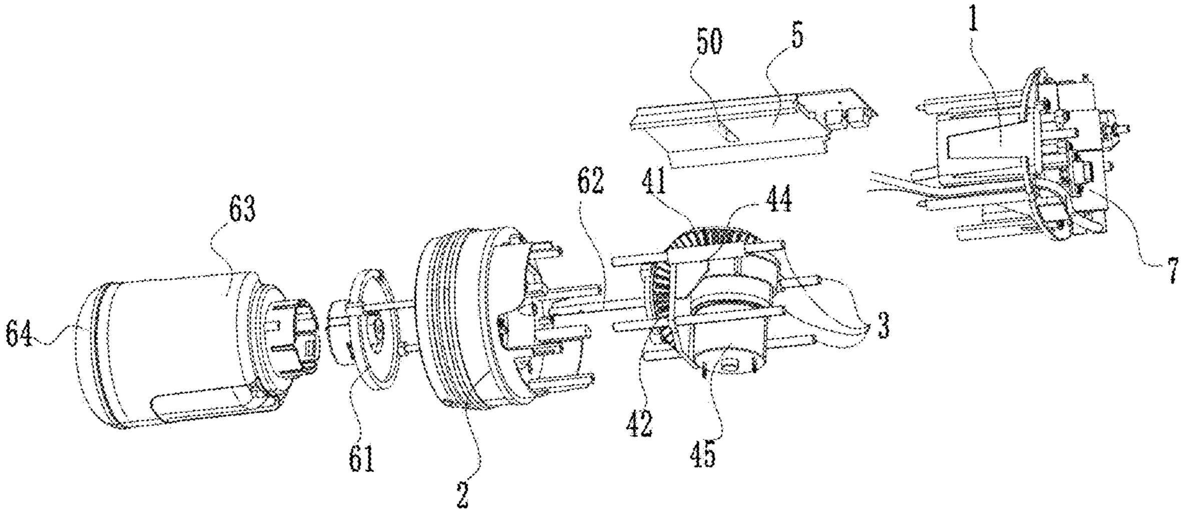
FIG. 4 is a schematic diagram of the exploded structure of the compound action core in the embodiment of the present disclosure.
Figure 8:
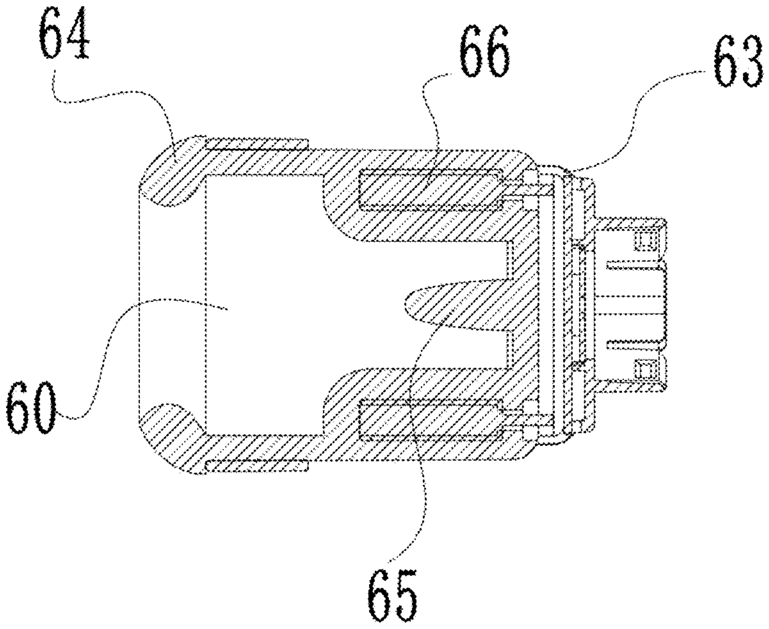
FIG. 8 is a schematic diagram of the structure of the flexible massage structure in the embodiment of the present disclosure.

The flexible massage structure 6, as the part that contacts the inserted part of human body and performs a compound massage action, needs to achieve a soft contact and be able to move synchronously. Specifically, as shown in FIG. 2 and FIG. 8, the flexible massage structure 6 comprises an adapter frame 61 slidably mounted on the second bracket 2, wherein a rotating shaft 62 is rotatably mounted between the adapter frame 61 and the first bracket 1, the rotating shaft 62 is fixed on a rotating member 42, one end of the rotating shaft 62 extending out of the adapter frame 61 is fixedly connected to a cup barrel 63, a flexible massage part 64 is embedded in the cup barrel 63, and the massage chamber 60 is arranged on the flexible massage part 64. As the flexible massage part 64 is embedded in the cup barrel 63, it drives the flexible massage part 64 to rotate and reciprocate, and protects the flexible massage part 64 simultaneously. The adapter frame 61 slides relative to the second bracket 2, so when it is driven by the rotating shaft 62 to reciprocate, it can have a limiting and guiding effect to further bear the force of the rotating shaft 62 connecting the cup barrel 63, and reduce the force that the rotating shaft 62 bears from the flexible massage structure 6, thereby ensuring that the rotating shaft 62 can pull the flexible massage structure 6 to reciprocate and rotate with minimal wear. Furthermore, the adapter frame 61 is used to improve the stability of the connection position and support the rotating shaft 62 to rotate, that is to say, the rotation of the rotating shaft 62 does not affect the rotation of the rotating shaft 62 relative to the adapter frame 61, so as to reduce the deformation of the rotating shaft 62, and further avoid the risk of swaying when the flexible massage structure 6 is driven.

In order to enhance the stimulating effect of the flexible massage portion 64 on the inserted part of human body, the flexible massage part 64 is provided with a protrusion 65 extending into the massage chamber 60, and the protrusion 65 is used to stimulate the inserted part of human body during massage actions such as rotating, reciprocating and sucking.

Furthermore, in order to provide vibration stimulation to the inserted part of human body, a plurality of vibration motors 66 evenly distributed circumferentially are embedded in the flexible massage part 64, a rotating conductive structure 67 is mounted on the adapter frame 61, and the wires of the vibration motors 66 are connected to the rotating conductive structure 67, wherein the rotating conductive structure 67 can be designed with an existing conductive slip ring structure to achieve conductive connection during rotating, so as to supply electricity to the vibration motors 66. Supplying electricity by probe contact can ensure that the flexible massage part 64 is able to continue realizing the operation of the vibration motors 66 during rotating, so that the flexible massage part 64 can continue rotating in one direction without considering how the cable is wound.

In addition, in order to facilitate the control of the internal components and display relevant information at the same time, a conventional circuit can be used. A control circuit board 8 is integrated on the guide bracket 5, and a display module and a control button module are integrated on the control circuit board 8, wherein the display module is used to display the current operation mode, and the control button module is used to control the actions of the internal vibration motors 66, the reducer motor 45 and the suction mechanism 7 respectively. The control circuit can be designed by directly applying proven technologies. This embodiment is mainly used to describe the relevant layout position and connection relationship.

Figure 9:
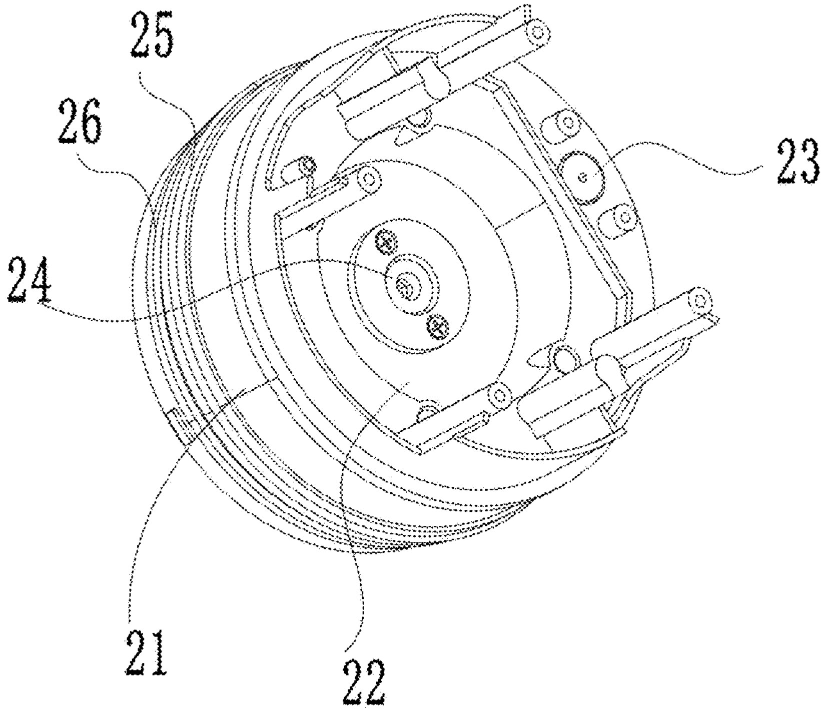
FIG. 9 is a schematic diagram of the structure of the second bracket in the embodiment of the present disclosure.
Figure 10:
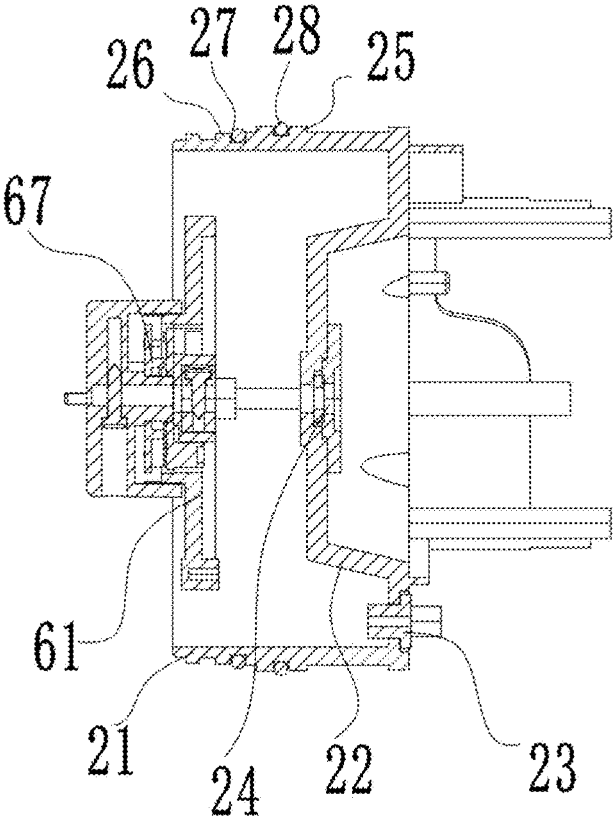
FIG. 10 is a schematic diagram of the cross-sectional structure of the second bracket in the embodiment of the present disclosure.
Figure 11:
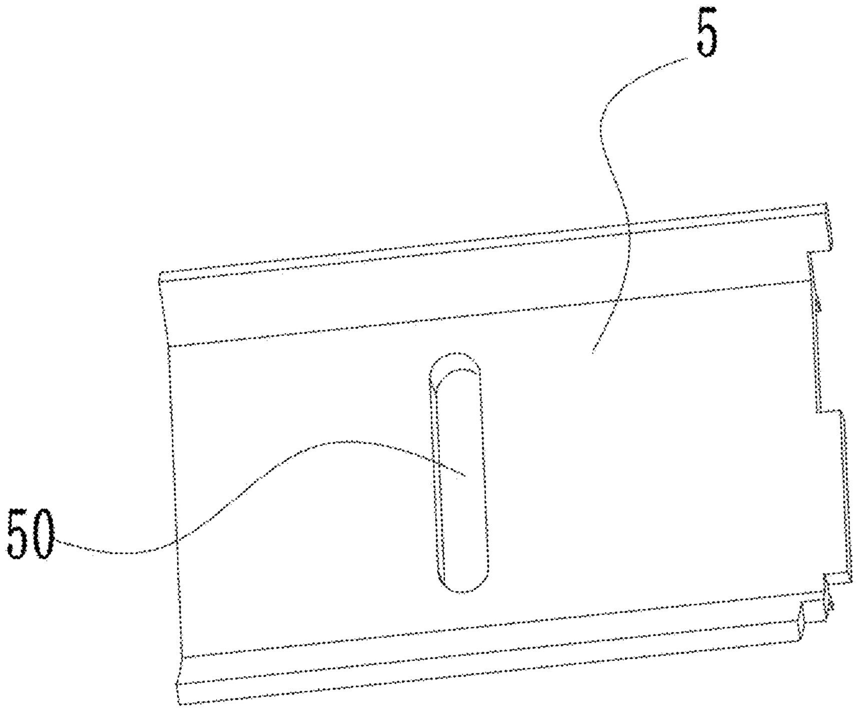
FIG. 11 is a schematic diagram of the structure of the guide bracket in the embodiment of the present disclosure.

Among them, the second bracket 2, as the main bearing member connecting the power part and the massage action part, needs to have an isolation effect and a good bearing effect, wherein, as shown in FIG. 9 and FIG. 10, the second bracket 2 comprises a connecting case 21 and an isolation case 22 that is concave and arranged inside the connecting case 21, wherein a waterproof rubber plug 23 is embedded on the isolation case 22, and the waterproof rubber plug 23 is used for the conductive cable that passes through the control circuit board 8 and the rotating conductive structure 67; and in addition, a waterproof pad 24 is provided between the isolation case 22 and the rotating shaft 62. Among them, the isolation case 22 is used to isolate the spaces on the two ends, so as to prevent liquid or impurities generated at the massage action part from entering the power part, forming a protection for the power part. The conductive cable passing through is sealed by the integrated waterproof rubber plug 23, and the waterproof pad 24 ensures that the part where the rotating shaft 62 passes through the isolation housing 22 is sealed, so that good sealing can be achieved when the rotating shaft 62 rotates or moves relative to the isolation housing 22.

In order to cover the internal parts and form an overall protection, as shown in FIG. 1, FIG. 9, and FIG. 10, a first step structure 25 and a second step structure 26 are provided on the side wall of the connecting case 21, a first housing 9 is mounted on the first bracket 1, and the open end of the first housing 9 is inserted into the first step structure 25; a second housing 10 extending into the first housing 9 is inserted on the second step structure 26; the open end of the second housing 10 extends to the opening of the massage chamber 60; and the second housing 10 is provided with a protective cover 11 on the open end, and covers the interior through the first housing 9 and the second housing 10. In addition, the protective cover 11 is added to form an openable or closable structure at the opening, for the convenience of opening when in use and covering after use.

Among them, as shown in FIG. 2, a clamping ring groove 13 is provided on the outer peripheral surface of the second housing 10, and a clamping convex ring 14 to engage with the clamping ring groove 13 is provided on the inner wall of the protective cover 11. The clamping convex ring 14 and the clamping ring groove 13 can be engaged to limit the position of the protective cover 11 in the closed state.

In addition, in order to form buffer protection for the part of human body inserted in from the open end, a buffer flexible ring 12 is embedded in the open end of the second housing 10.

When the first housing 9 and the second housing 10 are plug-connected by the first step structure 25 and the second step structure 26, it is necessary to reliably seal the position of interference fit. Therefore, each of the first step structure 25 and the second step structure 26 is provided with a sealing groove 27, and a sealing ring 28 is provided in front of the sealing groove 27.

In the disclosure, unless otherwise specified or restricted, the terms of "installation", "interconnection", "connection" and "fixing" shall be understood as a general sense. For example, the connection can be fixed connection, removable connection, integrated connection, mechanical connection, electrical connection, direct connection, indirect connection through intermediate media, connection between two components or interaction between two components. Persons of ordinary skill in the art can understand the specific meanings of the above terms in the present disclosure as appropriate.

In the description of the invention, it needs to be noted that the azimuth or position relationships indicated by the terms "center", "upper", "lower", "left", "right", "inside" and "outside" are based on those shown in the drawings, or those in which a product of the invention is usually placed when used. It is only for convenience of description and simplification of the present utility model, not to indicate or imply that the referred devices or components must have a specific orientation, be constructed and operate in a specific orientation, and thus cannot be understood as limiting the present utility model. Furthermore, the terms "first" and "second" are used merely for distinguishing purposes and shall not be construed as indicating or implying relative importance.

It is obvious to those skilled in the art that the present invention is not limited to the details of the above exemplary embodiment, and can be implemented in other specific forms without departing from the spirit or basic features of the present invention. Therefore, no matter from which point of view, the embodiment should be regarded as exemplary and non-limiting. The scope of the present invention is defined by the claims rather than the above description, so it is intended to include all changes that fall within the meaning and scope of the equivalent elements of the claims in the present disclosure. Any reference numerals in the claims should not be regarded as limiting the claims involved.

What is claimed is:

1. A compound massage action massager, comprising:

a first bracket and a second bracket, wherein a guide bracket and at least two guide rods are arranged between the first bracket and the second bracket, and the at least two guide rods serve as a connection structure between the first bracket and the second bracket;

a power mechanism is slidably mounted on the at least two guide rods, wherein the power mechanism comprises an eccentric member and a rotating member, the eccentric member is provided with an eccentric column, the guide bracket is provided with a swing groove for inserting the eccentric column, and the rotating member is connected to a flexible massage structure and a massage chamber on the flexible massage structure through a rotating shaft;

the first bracket is integrated with a suction mechanism connected to the massage chamber; and when the power mechanism drives the eccentric member and the rotating member to rotate synchronously, the flexible massage structure is configured to synchronously perform reciprocating massage, rotational massage and sucking massage to a part of the human body that is inserted into the massage chamber;

wherein the power mechanism comprises a motor bracket slidably mounted on the at least two guide rods, and both the eccentric member and the rotating member are rotatably mounted on the motor bracket, wherein a rotation axis of the eccentric member is perpendicular to a rotation axis of the rotating member, the eccentric member is engaged with the rotating member; and a reducer motor is mounted on the motor bracket, and an output shaft of the reducer motor is fixedly connected to the eccentric member;

wherein the flexible massage structure comprises an adapter frame slidably mounted on the second bracket, wherein the rotating shaft is rotatably mounted between the adapter frame and the first bracket, the rotating shaft is fixed on the rotating member, one end of the rotating shaft extending out of the adapter frame is fixedly connected to a cup barrel, a flexible massage part is embedded in the cup barrel, and the massage chamber is arranged on the flexible massage part;

wherein a plurality of vibration motors evenly distributed circumferentially are embedded in the flexible massage part, a rotating conductive structure is mounted on the adapter frame, and wires of the vibration motors are connected to the rotating conductive structure;

wherein a control circuit board is integrated on the guide bracket, and a display module and a control button module are integrated on the control circuit board;

wherein the second bracket comprises a connecting case and an isolation case that is concave and arranged inside the connecting case, wherein a waterproof rubber plug is embedded on the isolation case, and a waterproof pad is provided between the isolation case and the rotating shaft.

2. The compound massage action massager according to claim 1, wherein the eccentric member and the rotating member are bevel gears.

3. The compound massage action massager according to claim 1, wherein the eccentric member is a crown gear and the rotating member is a spur gear; or the eccentric member is a spur gear and the rotating member is a crown gear.

4. The compound massage action massager according to claim 1, wherein the flexible massage part is provided with a protrusion extending into the massage chamber.

5. The compound massage action massager according to claim 1, wherein a first step structure and a second step structure are provided on a side wall of the connecting case, a first housing is mounted on the first bracket, and an open end of the first housing is inserted into the first step structure; a second housing extending into the first housing is inserted on the second step structure;

an open end of the second housing extends to an opening of the massage chamber; and the second housing is provided with a protective cover on the open end of the second housing.

6. The compound massage action massager according to claim 5, wherein a buffer flexible ring is embedded in the open end of the second housing.

7. The compound massage action massager according to claim 5, wherein each of the first step structure and the second step structure is provided with a sealing groove, and a sealing ring is provided in front of the sealing groove.

8. The compound massage action massager according to claim 5, wherein a clamping ring groove is provided on an outer peripheral surface of the second housing, and a clamping convex ring to engage with the clamping ring groove is provided on an inner wall of the protective cover.

* * * * *